US008689003B2

(12) United States Patent
Agrawal

(10) Patent No.: US 8,689,003 B2
(45) Date of Patent: Apr. 1, 2014

(54) SYSTEM AND METHOD FOR SECURE PASSWORD-BASED AUTHENTICATION

(75) Inventor: Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1062 days.

(21) Appl. No.: 11/757,080

(22) Filed: Jun. 1, 2007

(65) Prior Publication Data
US 2013/0125221 A1 May 16, 2013

(51) Int. Cl.
*G06F 21/00* (2013.01)
(52) U.S. Cl.
USPC ............. 713/183; 713/171; 705/53; 709/200; 380/28; 380/46
(58) Field of Classification Search
USPC ....... 713/183, 171; 705/53; 709/200; 380/28, 380/46
See application file for complete search history.

(56) References Cited

U.S. PATENT DOCUMENTS

| 5,406,628 | A | 4/1995 | Beller |
| 6,539,479 | B1 * | 3/2003 | Wu ............................... 713/151 |
| 6,609,146 | B1 * | 8/2003 | Slotznick ...................... 709/200 |
| 7,047,408 | B1 | 5/2006 | Boyko |
| 7,448,049 | B1 * | 11/2008 | Xing ............................. 719/318 |
| 7,895,344 | B2 | 2/2011 | Gassoway |
| 2005/0176407 | A1 | 8/2005 | Tuomi |
| 2006/0005013 | A1 * | 1/2006 | Huitema et al. .............. 713/162 |
| 2008/0082447 | A1 * | 4/2008 | Jogand-Coulomb et al. ... 705/53 |
| 2008/0120275 | A1 * | 5/2008 | Cruanes et al. .................. 707/2 |
| 2008/0177812 | A1 * | 7/2008 | Brandle ........................ 708/250 |
| 2011/0268270 | A1 * | 11/2011 | Vanstone et al. ................ 380/46 |

OTHER PUBLICATIONS

Ross, et al(2005). Stronger Password Authentication Using Browser Extensions. Retrieved from http://www.usenix.org/events/sec05/tech/full_papers/ross/ross_html/index.html.*
RFC 2845. Retrieved from http://tools.ietf.org/html/draft-ietf-dnsext-tsig-sha-03.*
Menezes et al. (1997). Handbook of Applied Cryptography pp. 323-325 and 388-391.*
N. Provos and D. Mazières (1999). A future-adaptable password scheme. In Proceedings of the 1999 USENIX Annual Technical Conference, Freenix Track, Monterey, CA, Jun. 1999.*
J. A. Halderman, B. Waters, and E. Felten (2005). A convenient method for securely managing passwords. To appear in Proceedings of the 14th International World Wide Web Conference (WWW 2005), 2005.*

(Continued)

*Primary Examiner* — Brian Shaw
(74) *Attorney, Agent, or Firm* — Wolfe-SBMC

(57) ABSTRACT

Various embodiments of a system and method for secure password-based authentication are described. The system and method for secure password-based authentication may include an authentication component configured to request and receive authentication from an authenticating system according to a secure password-based authentication protocol. The authentication component may be configured to participate in an attack-resistant password-based authentication protocol such that an attacker who has compromised the authorizing system and/or a communication channel between the authentication component and the authenticating system may not determine a user's password and/or impersonate the user. In one embodiment, the authentication component may be configured to provide its attack-resistant password-based authentication functionality to an application (e.g., through a stand-alone application, plugin, or application extension). For instance, the authentication component may enable a web browser to participate in the attack-resistant password-based authentication protocol in order to access an online bank account from a web server.

33 Claims, 8 Drawing Sheets

(56) References Cited

OTHER PUBLICATIONS

Peter Groen, et al., "Accelerating the Secure Remote Password Protocol Using Reconfigurable Hardware," ACM 2004, pp. 471-480.

Wikipedia, "Hashcash in blogs," downloaded from en.wikipedia.org/w/index/php?title=Hashcash&oldid=120271678, Apr. 4, 2007, 3 pages.

Wikipedia, "Phishing," downloaded from en.wikipedia.org/w/index.php?title=Phishing&oldid=121803642, Apr. 10, 2007, 13 pages.

Blake Ross, et al., "Stronger Password Authentication Using Browser Extensions," Usenix—Security '05 Paper, 14th USENIX Security Symposium Technical Paper, Aug. 3, 2005, 23 pages.

* cited by examiner

SYSTEM AND METHOD FOR SECURE PASSWORD-BASED AUTHENTICATION

BACKGROUND

1. Field of the Invention

The present invention is directed to computer systems. More particularly, it is directed to authentication within computing environments.

2. Description of the Related Art

Password-based authentication protocols are among the most prevalent authentication protocols in use today. Typically, password-based authentication includes the use of a username that identifies a user and a password that verifies the user's identity. Many applications in use today utilize password-based authentication including online accounts, such as online bank accounts, online credit card accounts, and various online consumer accounts. For instance, before accessing an online bank account through the Internet, a user may be required to provide the bank website with a username and password in order to verify the user's identity. If the user provides the correct username and password combination, they may be given access to the online bank account in order to view account statements, transfer funds to other bank accounts, and other activities usually reserved for authorized individuals.

Since username and password combinations typically protect valuable items, such as access to bank or credit accounts, they have become frequent targets for social engineering attacks. One such attack is commonly referred to as "phishing." Phishing is performed by "phishers" who attempt to fraudulently acquire sensitive information about a user including, but not limited to, username and password combinations, credit card numbers, addresses, names, personal identification numbers (PINs), and other information that may be used to defraud an individual. One common form of phishing is implemented through electronic mail messages ("emails") that appear to be sent from a credible source. In many cases, a fraudulent email informs a user of an artificial circumstance that requires the user to provide sensitive information, such as a username and password. For example, some emails sent by phishers may indicate that a user's online account has recently undergone upgrades and that the user must provide their username and password to regain access to the account. Such emails may include a hyperlink to a fraudulent webpage that appears to be a legitimate login page of an online account. If an unsuspecting user provides their username and password to the fraudulent webpage, the username and password may be compromised, and the phisher may use the username and password to impersonate the user.

Various techniques have been utilized to prevent damage from phishing and other social engineering attacks. One such method includes requiring the user to carry a "token." A token is typically "something that the user has" that verifies the user's identity. In other words, the user may verify his identity by proving he has possession of the token. The token may indicate a security code, such as through an electronic display. In many cases, the security code is time-dependent (e.g., the security code may change every minute). In most cases, the security code changes based on a time-dependent algorithm which is also known to the verifying entity (e.g., a bank), and thus the verifying entity may use the algorithm to determine if a given security code is legitimate. Authentication protocols including tokens may require the user to provide a username, a password, and the security code of the token. Accordingly, if a phisher obtains the username and password of a user, the phisher may not easily impersonate the user since the security code is also needed to gain access to the user's account. In spite of the use of a token, there are some circumstances when a phisher may access the user's account. For example, if a phisher obtains a username, password, and token security code, the phisher may impersonate the user at any time before the token security code expires. Additionally, the use of a token does not alone prevent "man-in-the-middle" attacks, such as situations where an attacker has complete (or nearly complete) access to the communication channel between a user and a verifier (e.g., an online bank).

Other techniques include requiring the user to make a security decision, such as verifying that a picture previously uploaded by the user is visible on a website to which the user seeks access. In other cases, web browsers and other applications may include security indicators such as security icons (e.g., a "lock" icon) or other indicators (e.g., the display of "https" instead of "http" in the web address field) that indicate the presence of a secure connection. Typically, when displaying an illegitimate webpage, web browsers do not display such indicators, and thus the user, by checking for such indicators, may determine whether a webpage is legitimate or illegitimate. In many cases, security techniques that require the user to make a security decision are unsuccessful due to human error. For example, the user may forget or may not be trained to check for previously uploaded pictures or security indicators.

Some password-based authentication protocols are also susceptible to "brute force attacks." Brute force attacks include exhaustively checking possible passwords for a given username. For example, if an attacker knows the parameters of a given password, such as password length and possible characters, the attacker may exhaustively check all possible passwords for the given username. Even with modern computing power, some brute force attacks (e.g., for particularly long or well structured passwords) may be computationally infeasible. To reduce computational cost, an attacker may implement a similar attack known as a "dictionary attack." Instead of exhaustively checking all possible passwords, a dictionary attack may include checking passwords from a list, such as a list of words from a dictionary as well as variations of such words. In some cases, dictionary attacks may be successful due to many users' tendency to choose passwords that are easy to remember, such as words of their native language.

SUMMARY

Various embodiments of a system and method for secure password-based authentication are described. The system and method for secure password-based authentication may include an authentication component configured to request and receive authentication from an authenticating system according to a secure password-based authentication protocol. The authentication component may be configured to participate in an attack-resistant password-based authentication protocol such that an attacker who has compromised the authorizing system and/or a communication channel between the authentication component and the authenticating system may not determine a user's password and/or impersonate the user.

In various embodiments, the authentication component may prompt a user for a master password. For example, upon first use of the authentication component by a particular user, the authentication component may request a master password from the user. In many cases, it may only be necessary for the user to provide the master password once for a particular computer system. In various embodiments, configuring an authentication component residing on another computer system for a particular user may include providing the authentication component with the particular user's master password.

In various embodiments, the authentication component may utilize generated passwords that mask user passwords. For example, during authentication registration (e.g., the initial selection of a username and password), the authentication component may receive a password from the user, generate a new password based on the user's password (e.g., by combining the user password with the master password and/or utilizing a hash function), and use the generated password for authentication instead of the user's password. In subsequent authentication requests (e.g., using the username and password to gain access to an account or other item), the authentication component may receive the password from the user, replace the password by generating a new password as described above, and proceed with authentication. In other words, the password that is utilized for authentication is different than the password provided by the user. In this manner, the authentication component may prevent or reduce social engineering attacks, such as phishing attacks. For example, if a user reveals their password to a phisher, an account or other item protected by the password may not be at risk since the phisher may not determine the associated generated password.

In various embodiments, the authentication component may generate one or more generated passwords based on a constrained hash function. In other words, the hash function may be limited to results that adhere to a particular constraint. Enforcing constraints on hash function may increase the amount of computation and/or time necessary to create a generated password. Accordingly, the authentication component may utilize constraints to prevent and/or reduce dictionary attacks.

In various embodiments, the authentication component may utilize generated passwords within a zero knowledge proof protocol for authentication such that social engineering attacks, authenticating system attacks (e.g., server-side attacks), and attacks on the communication channel between the authentication component and an authentication system are rendered ineffective and/or computationally infeasible.

In various embodiments, the authentication component may be configured to interact with an application, such as a web browser, configured to access content or data (e.g., an online account, files, or other item) from the authenticating system. In one embodiment, the authentication component may be configured to provide its attack-resistant password-based authentication functionality to the application (e.g., through a stand-alone application, plugin, or application extension). For instance, the authentication component may enable a web browser to participate in the attack-resistant password-based authentication protocol in order to access an online bank account from a web server.

While the system and method for secure password-based authentication is described herein by way of example for several embodiments and illustrative drawings, those skilled in the art will recognize that the system and method for secure password-based authentication is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for secure password-based authentication as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for secure password-based authentication are described. The system and method for secure password-based authentication may include an authentication component configured to request and receive authentication from an authenticating system according to a secure password-based authentication protocol. The authentication component may be configured to participate in an attack-resistant password-based authentication protocol such that an attacker who has compromised the authenticating system and/or a communication channel between the authentication component and the authenticating system may not determine a user's password and/or impersonate the user. In various embodiments, the authentication component may be configured to interact with an application, such as a web browser, configured to access content or data (e.g., an online account, files, or other item) from the authenticating system. In one embodiment, the authentication component may be configured to provide its attack-resistant password-based authentication functionality to the application (e.g., through a stand-alone application, plugin, or application extension). For instance, the authentication component may enable a web browser to participate in the attack-resistant password-based authentication protocol in order to access an online bank account from a web server.

Figure 1:
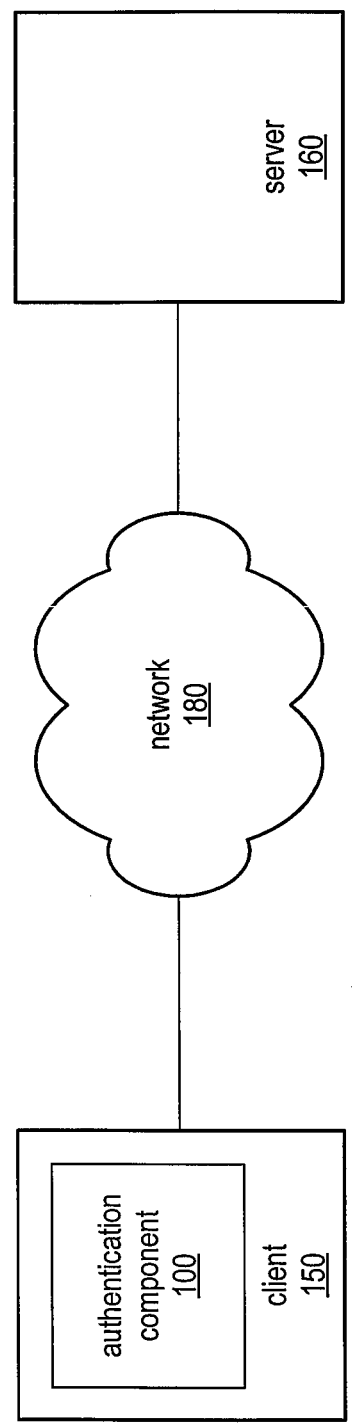
FIG. 1 is a block diagram illustrating an exemplary system in which an authentication component may be implemented.

An exemplary system in which an authentication component may be implemented is illustrated by the block diagram of FIG. 1. In various embodiments, a system requesting authentication, such as client 150, may request authentication from an authentication provider, such as server 160. As used herein, the terms 'client' and 'server' pertain to the authentication relationship between client 150 and server 160; no other relationship is necessarily implied by the terms 'client' and 'server.' For example, in various embodiments, client 150 and server 160 may be computer systems other than systems adhering to a traditional client-server relationship. In one embodiment, client 150 and server 160 may be peer nodes in a peer-to-peer networking environment. In other embodiments, client 150 may be a computer system configured to enable a user to browse the World Wide Web and server 160 may be a web server. Additionally, client 150 and server 160 may communicate over a network, such as network 180. In various embodiments, network 180 may be a Local Area Network (LAN), Wide Area Network (WAN) (e.g., the Internet), or a combination thereof.

Authentication component 100 may be configured to provide client 150 with secure password-based authentication without the need for the user to provide security tokens or other items other than a username and password. Authentication component 100 may utilize various techniques including, but not limited to, password modification, hash constraints, and zero knowledge proof protocols as describe below in regard to FIGS. 2A-2B. In some embodiments, authentication component 100 may be configured to prevent a security attack from an attacker even if the attacker has compromised server 160 and/or the communication channel between client 150 and server 160. In many embodiments, passwords provided by a user to the authentication component (and/or plain-text equivalents of passwords) are not transmitted to server 160 nor stored within server 160.

Initial Configuration of the Authentication Component

In various embodiments, authentication component 100 may be configured to receive a master password (referred to herein as "MasterPWD"). For example, the authentication component may receive a password chosen by a user, such as the maiden name of the user's mother, the name of the user's elementary school, or any other password specified by the user. The use of a MasterPWD may provide portability to authentication component 100. In other words, if the user travels to another client equipped with authentication component 100, the user may provide the same MasterPWD in order to configure the device for authentication. In many cases, authentication component 100 may only need to receive the MasterPWD once for the particular system (e.g., client 150).

Username and Verifier Registration

Figure 2A:
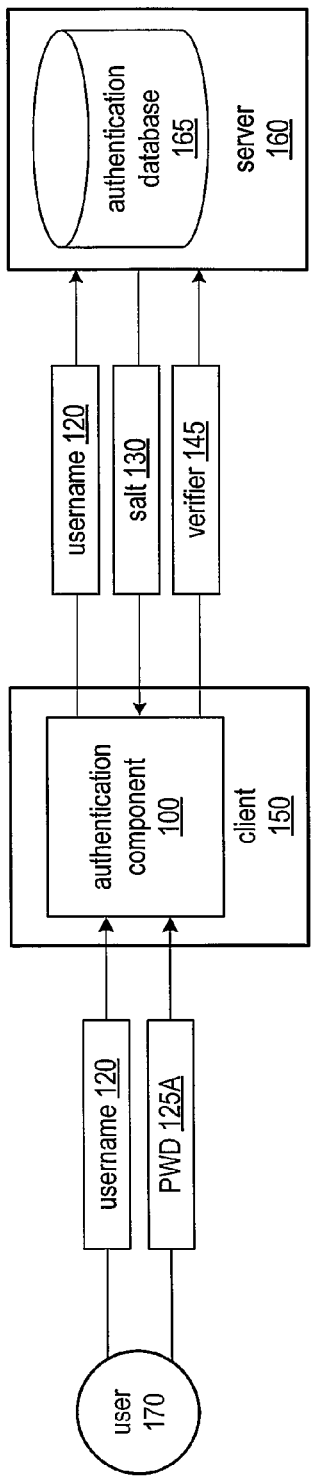
FIG. 2A is a data flow diagram illustrating an authentication component configured to register a username and verifier with a server, as described herein.

In many cases, to utilize a password based authentication protocol, it may be necessary to provide a username and associated password as part of the registration process. The data flow diagram of FIG. 2A illustrates an exemplary registration process implemented by authentication component 100. Authentication component 100 may be configured to receive a username and password (referred to herein as "PWD") from a user and register the username and an associated verifier with an authenticating system, such as server 160. In many cases, the username and PWD may be associated with a particular account (e.g., online bank account, email account, and other accounts requiring authentication). Accordingly, username and verifier registration may occur for multiple accounts each having different username and password combinations. The authenticating system, such as server 160, may be configured to authenticate client 150 (and/or user 170) in response to receiving the appropriate items (e.g., username and verifier), as described below. For instance, by authenticating client 150, server 160 may enable client 150 (and/or user 170) to access one or more items, such as accounts, web pages, web resources, files, computer systems, and other items.

In various embodiments, authentication component 100 may receive a desired username and PWD from user 170, such as username 120 and PWD 125A. As part of the registration process, authentication component 100 may provide server 160 with the desired username, such as username 120. Additionally, server 160 may respond to the username registration by providing the authentication component with a salt, such as salt 130. Salt 130 may be a random string, number, or combination thereof. In other embodiments the transfer of the salt may occur before the transfer of the username to server 160. For example, authentication component 100 may request and/or receive salt 130 from server 160 and subsequently provide username 120 to server 160. The salt may be used for computations of the authentication component as described in more detail below.

Authentication component 100 may create a generated password from MasterPWD and PWD, such as $PWD_{gen}$. In various embodiments, $PWD_{gen}$ may be generated as follows:

$$PWD_{gen} = HASH\ (MasterPWD, PWD)$$

In other words, $PWD_{gen}$ may be the result of a hash function performed on the MasterPWD and the PWD. In one embodiment, the MasterPWD and the PWD may be combined before hashing. For instance, a summation (e.g., MasterPWD+PWD) or other arithmetic operation may be performed on the MasterPWD and PWD, and the result of the operation may be hashed to create $PWD_{gen}$. For example, in one embodiment, $PWD_{gen}$ may be generated according to the following equation.

$$PWD_{gen} = HASH\ (MasterPWD+PWD)$$

The hash functions described herein may be any of various hash functions including, but not limited to, the Secure Hash Algorithm (SHA) (e.g., SHA-1, SHA-0, SHA-224, SHA-256, SHA-384, SHA-512, and other SHA variations), the RACE Integrity Primitives Evaluation Message Digest (RIPEMD) (e.g., RIPEMD-128, RIPMED-160, RIPEMD-256, RIPEMD-320, and other RIPEMD variations), the Message Digest algorithm (MD) (e.g., MD-3, MD-4, MD-5, and other MD variations), the Tiger and Tiger2 hash functions (e.g., Tiger-128, Tiger-160, Tiger-192, Tiger2-128, Tiger2-160, Tiger2-192, and other Tiger variations), the Very Efficient Substitution Transposition (VEST) (e.g., VEST-4, VEST-8, VEST-16, VEST-32, and other VEST variations), and/or the WHIRLPOOL hash function.

In various embodiments, authentication component 100 may adhere to one or more constraints when computing $PWD_{gen}$. In some cases, authentication component 100 may adhere to one or more hash constraints, which require that a particular pattern, such as a particular bit pattern, must be present within $PWD_{gen}$. The constraints that authentication component 100 may use to calculate hash results (and thus $PWD_{gen}$) may be specified by authentication component 100, user 170, or server 160. In one embodiment, a constraint may require that a specific number of leading bits of the hash result (i.e., $PWD_{gen}$) be zeros. For instance, an exemplary constraint may indicate that the first 16 high-order bits of the resultant hash must be zero. If authentication component 100 determines that a hash result does not adhere to a particular constraint, the authentication component may modify (e.g., increment and/or decrement by 1 or more) one or more inputs (e.g., MasterPWD, PWD, and/or a combination thereof) of the hash function, re-compute the hash result, and determine whether the new hash result meets the particular constraint. The authentication component may repeat this process until a hash result that meets the particular constraint is computed. In other words, the authentication component may regenerate the hash result until the hash (or a portion of the hash) matches the constraint (e.g., a bit pattern). The authentication component adhering to one or more constraints when calculating the hash result (i.e., $PWD_{gen}$) may prevent and/or reduce the effectiveness of dictionary attacks on $PWD_{gen}$ by increasing the computational requirements and/or time required to complete an attack. For instance, consider the following exemplary hash resultants against the exemplary constraint described above (e.g., 16 high-order bits must be equal to zero).

$Hash_A$=4ad5bca68ea8ca15e8860c30e024f4f2e51dbe1f $Hash_B$=0000b505b4b87cb4584535ed7c0b16a2bb2634f3

In this example, $Hash_A$ and $Hash_B$ are exemplary hexadecimal representations of SHA-1 results. $Hash_A$ does not meet the exemplary constraint; one or more of the first 16 high-order bits of $Hash_A$ are not equal to zero. By contrast, $Hash_B$ does meet the exemplary constraint; the first 16 high-order bits of $Hash_B$ are equal to zero. Since generating a hash result that meets a particular constraint may require multiple iterations of the hash function, the computation requirements and/or time to create such a hash result may be larger than the computation requirements and/or time necessary to create an unconstrained hash result.

Moreover, one skilled in the art will recognize that hash functions, such as the hash functions described herein, typically exhibit "trapdoor" properties. In other words, it may not be possible to easily determine the input of the hash function given a particular output. In many embodiments, the hash functions used to generate the various passwords and verifiers described herein may be cryptographically strong. In other words, breaking (e.g., a brute force attack) a cryptographically strong hash function may be computationally infeasible. For instance, in some cases, to determine the input of a hash function, the attacker must use a brute force attack to try all possible inputs of the hash function and record the corresponding outputs or "hashes" for the hash function. However, for cryptographically strong hash functions (e.g., SHA-1) the number of possible inputs may be so large that a brute force attack may not be computationally feasible (e.g., the max input size for SHA-1 is approximately $2^{64}$ bits).

Accordingly, in many cases, an attacker may alternatively choose to utilize a more computationally feasible attack such as a dictionary attack in order to determine the input of a particular hash function. However, authentication component 100 may employ a variety of techniques to prevent such an attack. As described above, when calculating $PWD_{gen}$, authentication component 100 may use a combination of MasterPWD and PWD as the input to the hash function. In many cases, the result of such a combination (e.g., a bitwise addition of MasterPWD and PWD) would be less susceptible to a dictionary attack since dictionary attacks typically target inputs that are elements of a user's native language (or slight variations thereof). Additionally, constraints, such as enforcing particular patterns within hash results, increase hash computation time. By using constraints to increase computation time for hash resultant generation, authentication component 100 may render dictionary attacks computationally infeasible.

After calculating $PWD_{gen}$, authentication component 100 may generate a verifier V, such as verifier 145, according to a zero knowledge proof protocol. One example of a zero knowledge proof protocol includes the Secure Remote Password (SRP) protocol. In various embodiments, the verifier may be created from $PWD_{gen}$ and a salt, such as salt 130 described above. Additionally, in most cases, determining the password used to create a verifier (e.g., $PWD_{gen}$) may be computationally infeasible given the verifier alone. This property may be achieved by utilizing a hash function or other function exhibiting trap door properties to create the verifier. For instance, in one embodiment, the verifier may be generated according to the following equations.

$x$=HASH (salt, $PWD_{gen}$)

$V=g\hat{\ }x$

In the above example, g may be a primitive root modulo n where n is a large prime number. After generating verifier 145 according to a zero knowledge proof protocol, authentication component 100 may provide and/or register the verifier with server 160. Server 160 may store the verifier in a database or other storage mechanism, such as authentication database 165. In various embodiments, server 160 may create and/or maintain authentication records within authentication database 165 that include the username associated with a user, the salt associated with the username, as well as the associated verifier provided by client 150.

In various embodiments, client 150 may not transmit $PWD_{gen}$ (and/or a plain-text equivalent of the password) to server 160. Accordingly, server 160 may not store $PWD_{gen}$ (and/or a plain-text equivalent of $PWD_{gen}$). For subsequent authentications of client 150, server 160 may utilize verifier 145 to determine that the user knows the correct password (e.g., the correct PWD used to create the correct $PWD_{gen}$) as described in more detail below. In other words, client 150 (and/or user 170) may prove that it has knowledge of the correct PWD without actually transferring the PWD to the server. In various embodiments, this may prevent an attacker from gaining knowledge of the correct PWD (as well as the MasterPWD and/or $PWD_{gen}$). More specifically, since the correct PWD (as well as the MasterPWD and/or $PWD_{gen}$) may not be transferred to the server 160, an attacker who has comprised the server and/or the communication channel between the server in the client may not be able to determine the correct PWD (as well as the MasterPWD and/or $PWD_{gen}$).

Subsequent Authentication

Figure 2B:
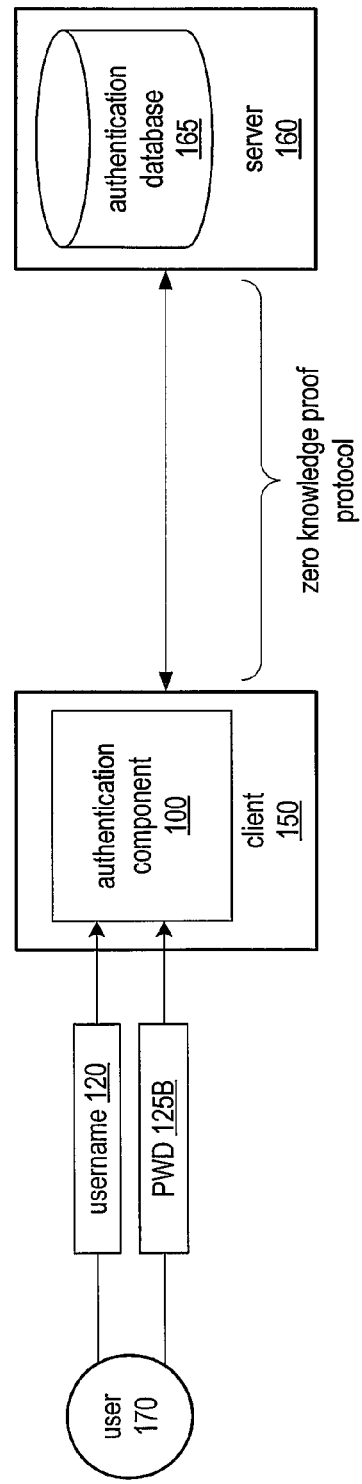
FIG. 2B is a data flow diagram illustrating an authentication component participating in an authentication protocol with a server, as described herein.

After a username and verifier have been registered with the server, such as described above in regard to FIG. 2A, the client (and/or user) may be authenticated during subsequent accesses to server 160. FIG. 2B includes a data flow diagram illustrating an example of the operation of authentication component 100 during post-registration accesses of server 160, according to one embodiment. To begin authentication, user 170 may provide username 120 and PWD 125B to authentication component 100 in order to access server 160. For example, server 160 may be a web server, and the user may be attempting to view a secured webpage with client 150. After receiving PWD 125B from the user, authentication component 100 may generate a combined password, which may be referred to herein as $PWD_{com}$. $PWD_{com}$ may be generated in the same manner that $PWD_{gen}$ is generated during registration. Accordingly, if the PWD provided by the user during registration, such as PWD 125A, is the same as the PWD used during subsequent accesses of server 160, such as PWD 125B, then $PWD_{com}$ may be the same as $PWD_{gen}$. If PWD 125B is not the same as PWD 125A, then $PWD_{com}$ may not be the same as $PWD_{gen}$ and authentication may fail. Once authentication component 100 has determined $PWD_{com}$, the authentication component may use $PWD_{com}$ to request authentication from server 160. As illustrated, the authentication protocol used to authenticate client 150 (and/or user 170) may include a zero knowledge proof protocol.

Figure 3:
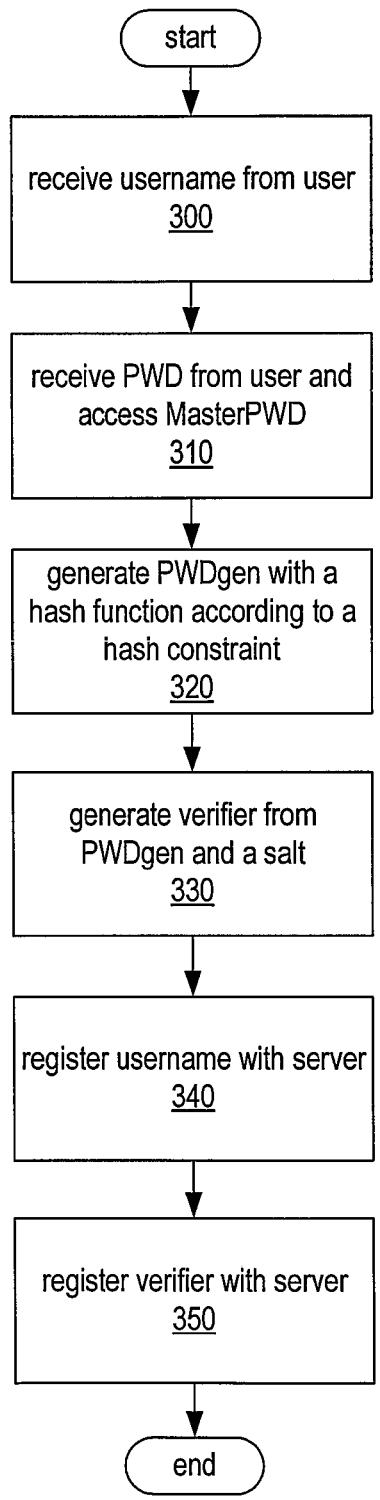
FIG. 3 is a flowchart illustrating an exemplary method for registering a username and verifier with a server.

An exemplary method for registering a username and verifier with an authenticating system (e.g., server 160) is illustrated in FIG. 3. In various embodiments, the method described herein may be implemented by authentication component 100. The method may begin by receiving a username from a user as illustrated by block 300. In general, the username may be any username specified by the user that adheres to the username requirements of the server. For example, while the user may choose a particular username, in some cases the server may require that the username be no longer than a certain number of characters. In addition to a username, the method may include receiving a PWD from the user and accessing a MasterPWD (e.g., the MasterPWD stored by authentication component 100) as illustrated by block 310. In many cases, the PWD may be specific to a particular server or to a particular account (e.g., a bank account, email account, or password protected account) provided by a server.

As illustrated by block 320, the method may further include generating a password, such as $PWD_{gen}$, from the PWD provided by the user and a MasterPWD specified by the user, such as the MasterPWD described above. In various embodiments, $PWD_{gen}$ may be generated as follows:

$$PWD_{gen} = HASH (MasterPWD, PWD)$$

In other words, $PWD_{gen}$ may be the result of a hash function performed on the MasterPWD and the PWD. In one embodiment, the MasterPWD and the PWD may be combined before hashing. For instance, a summation (e.g., MasterPWD+PWD) or other arithmetic operation may be performed on the MasterPWD and PWD, and the result of the operation may be hashed to create $PWD_{gen}$, such as:

$$PWD_{gen} = HASH (MasterPWD+PWD)$$

Additionally, generating $PWD_{gen}$ may include generating $PWD_{gen}$ according to one or more hash constraints. In some cases, the hash constraints may require a particular pattern be present within $PWD_{gen}$. For example, in one embodiment, a constraint may require that a specific number of leading bits of the hash result (i.e., $PWD_{gen}$) be zeros. For instance, an exemplary constraint may indicate that the first 16 high-order bits of the resultant hash must be zero. The method may include utilizing other constraints, such as the constraints described above in regard to FIG. 2A.

The method may further include generating a verifier V from $PWD_{gen}$ and a salt, as illustrated by block 330. Accordingly, the method may also include receiving the salt from the authenticating server. The salt may be a random string, number, or combination thereof. In various embodiments, generating the verifier may include generating a verifier according to a zero knowledge proof protocol, such as SRP. In one embodiment, the verifier may be generated as follows:

$$x = HASH (salt, PWD_{gen})$$

$$V = g\hat{\ }x$$

In the above equation for the verifier, g may be a primitive root modulo n where n is a large prime number. Additionally, the method may include transmitting the username to the server, as illustrated by block 340, and transmitting the verifier to the server, as illustrated by block 350. In various embodiments, transmitting the username and/or the verifier may include transmitting the username and/or verifier over a LAN, WAN, or combination thereof (e.g., network 180).

Figure 4:
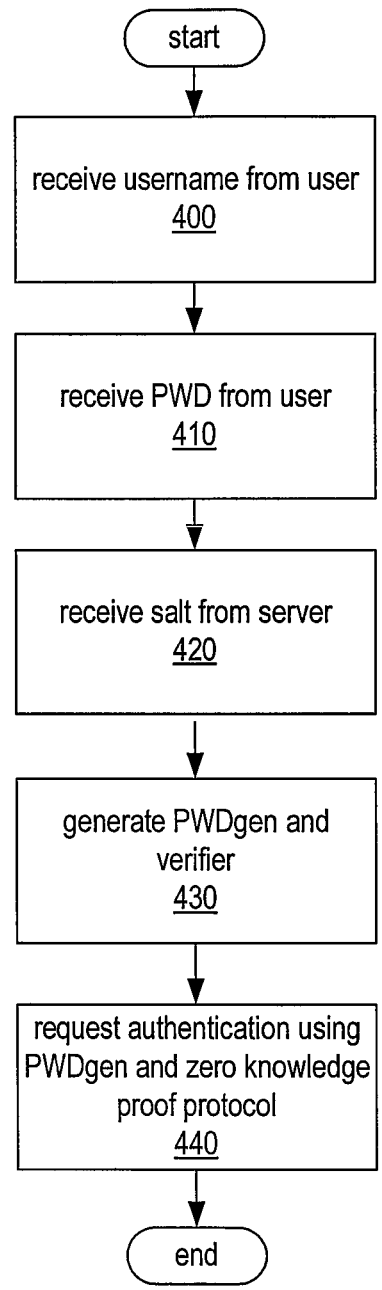
FIG. 4 is a flowchart illustrating an exemplary method for requesting authentication from a server by using a generated password and zero knowledge proof protocol.

An exemplary method for authenticating a client (and/or user) is illustrated by the flowchart of FIG. 4. In various embodiments, the method described may be implemented by authentication component 100. As illustrated by block 400, the method may include receiving a username from a user. For example, if the user is attempting to access an online bank account, the username may be the username that was creating during registration of the online bank account. In addition to the username, the method may include receiving a PWD (e.g., PWD 125B described above) from the user, as illustrated by block 410. As illustrated by block 420, the method may include receiving the salt from the server. In various embodiments, the salt may uniquely identify the particular server and/or account protected by authentication. For example, when engaging in authentication with an online bank account, the method may include receiving a salt that uniquely identifies the online bank account. As illustrated by block 430, the method may further include generating $PWD_{gen}$ and a verifier. In general, the method may include the techniques for generating $PWD_{gen}$ and the verifier as described above in regard to FIG. 2B. For example, in one embodiment, $PWD_{gen}$ may be generated using a combination of the PWD received from the user as well as a MasterPWD.

After generating the $PWD_{gen}$ and the verifier, authentication may be requested from a server by using the PWDgen with a zero knowledge proof protocol, as illustrated by block 440. While the method may include implementing any of various zero knowledge proof protocols, the description below pertains to one example of implementing authentication with $PWD_{gen}$ and the SRP zero knowledge proof protocol. Requesting authentication using $PWD_{gen}$ and a zero knowledge proof protocol may include transmitting the user's username to the server (e.g., server 160). The server may lookup the username within a database (e.g., authentication database 165) and determine the verifier and salt associated with the username. In most cases, the verifier and salt may have been provided during the registration process. Accordingly, the method may include receiving the salt from the server. In many cases, a salt may be unique to a particular server (or account). For example, the salt may be associated with a particular webpage or online bank account.

After receiving a salt from the server, the method may further include calculating a long-term private key for use during authentication. In one embodiment, the long term private key $K_{LT}$ may be generated according to the following equation:

$$K_{LT} = HASH (salt, PWD_{gen})$$

The argument $PWD_{gen}$ may be determined as described above. For example, $PWD_{gen}$ may be a combination of a user's PWD and a MasterPWD. Additionally, the hash function used to determine the long term private key may be SHA-1 or any other hash function described above.

The method may further include generating a random number a, which is greater than 1 and less than n where n is a large prime number. The method may further include generating an ephemeral (e.g., short term) public key $K_E$ from g, which is a primitive root modulo n. In one embodiment, the ephemeral public key may be generated according to the following equation:

$$K_E = g\hat{\ }a$$

After generating the ephemeral public key, the method may include transferring the ephemeral public key to the server. The method may also include receiving an ephemeral key $K_{ES}$ from the server, which is different than the ephemeral key provided to the server, and generating a random number b greater than 1 and less than n. In one embodiment, the server may generate the ephemeral key $K_{ES}$ according to the following equation:

$$K_{ES} = V + g\hat{\ }b$$

In the above equation for the server's ephemeral key, V represents the verifier created during registration as described above. The method may further include receiving the ephemeral public key $K_{ES}$ generated by the server and receiving a randomly generated parameter u from the server.

After each ephemeral public key has been generated, the method may include generating a common exponential value S. In one embodiment, the common exponential value S may be generated according to the following equation:

$$S=(K_{ES} \cdot g^{\wedge}K_{LT})^{\wedge}(a+(u \cdot K_{LT}))$$

Additionally, the server may generate a common exponential value $S_S$. In one embodiment, the server may generate the common exponential value $S_S$ according to the following equation:

$$S_S=(K_E \cdot (V^{\wedge}u))^{\wedge}b$$

In various embodiments, if the $PWD_{gen}$ used to create S is the same as the $PWD_{gen}$ used to create the verifier V, then the common exponential value S will be equivalent to the common exponential value $S_S$ created by the server. Moreover, the method may further include generating a cryptographically strong session key K. In various embodiments, the cryptographically strong session key may be generated according to the following equation:

$$K=\text{HASH}(S)$$

The hash function used to create the cryptographically strong session key may be any of the various hash functions described above. Similarly, the server may generate a cryptographically strong session key $K_S$ according to the following equation:

$$K_S=\text{HASH}(S_S)$$

In many embodiments, the particular hash functions used to create K and $K_S$ may be the same. Additionally, if the common exponential values S and $S_S$ are equivalent, the resulting cryptographically strong session keys K and $K_S$ may be equivalent.

The method may further include utilizing messages to determine if the cryptographically strong session keys are equivalent. In one embodiment, the method may include generating a message $M_1$ and transferring the message to the server as evidence of possessing the correct session key. In various embodiments, the message $M_1$ may be generated according to the following equation:

$$M_1=\text{HASH}(K_E, K_{ES}, K)$$

In various embodiments, the server may verify the message $M_1$ after receipt. To verify $M_1$, the server may generate a copy of $M_1$ according to the equation above and check to see if its copy matches the received $M_1$. Additionally, the server may generate a message $M_2$. In various embodiments, the server's message $M_2$ may be generate according to the following equation:

$$M_2=\text{HASH}(K_E, M_1, K)$$

The method may further include receiving the server's message $M_2$ from the server. The method may also include generating a copy of $M_2$ according to the equation above and determining if the copy of $M_2$ matches the copy received from the server. If both $M_1$ and $M_2$ are verified to be correct, authentication may be complete. If either message is determined to be incorrect, authentication may fail and communications with the server may cease.

Figure 5:
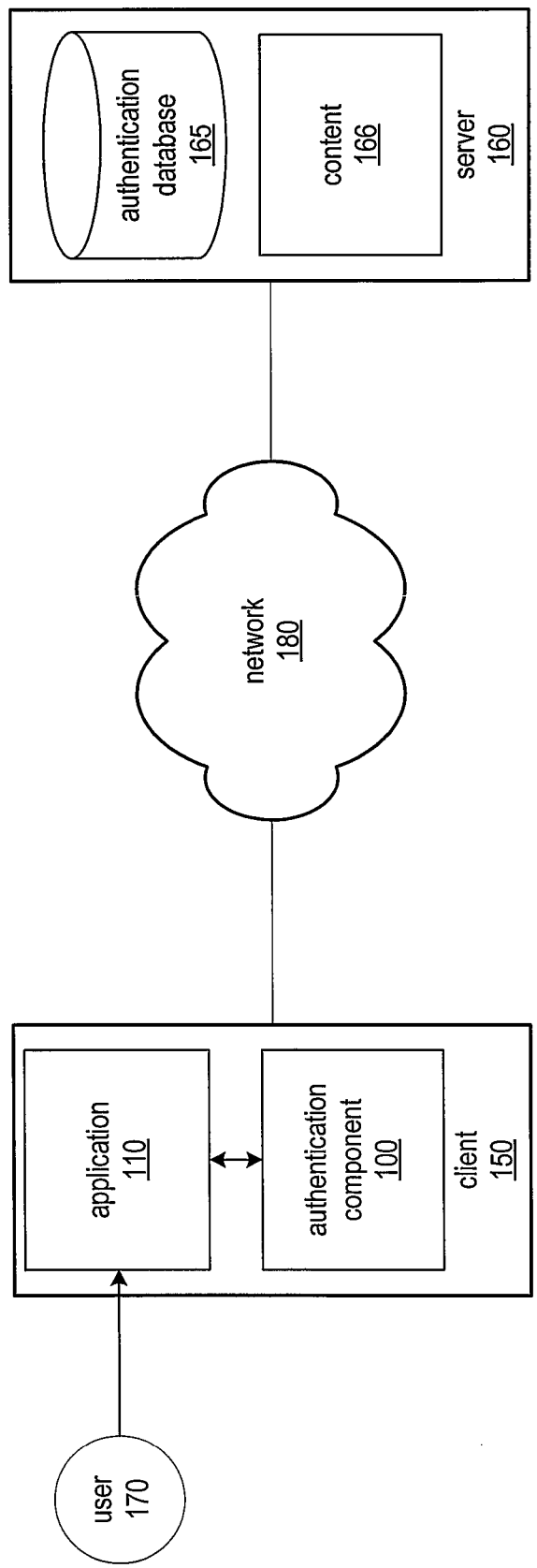
FIG. 5 is a block diagram illustrating an exemplary system in which an authentication component may be implemented.

In various embodiments, authentication component 100 may be configured to interact with various applications. The block diagram of FIG. 5 illustrates an exemplary implementation of authentication component 100. In various embodiments, authentication component 100 may provide its authentication functionality to one or more applications, such as application 110. In one embodiment, authentication component 100 may be a stand-alone application configured to communicate with application 110 through one or more interfaces, such as an application programming interface (API). In other cases, authentication component 100 may be an embedded feature of application 110. In some cases, authentication component 100 may be a plug-in or application extension configured to provide functionality to application 110. In general, authentication component 100 may be implemented in any manner that enables application 110 to utilize its authentication functionality.

Application 110 may be any application configured to access data or content from another computer system, such as content 166. In one embodiment, application 110 may represent any of various web-browsing applications, such as Microsoft Internet Explorer™, Netscape Navigator™, Mozilla Firefox™, or any application that is capable of accessing and displaying documents or web pages, such as according to the Hypertext Transport Protocol (HTTP). For example, user 170 may use application 110 to log in to an online bank account to view a bank statement or transfer funds from one account to another. In general, application 110 may be any application that may need access to content or data requiring authentication. For example, server 160 may require that application 110 be authenticated before accessing content 166. Content 166 may be any content, data, and/or resource that may be protected by authentication. For instance, in various embodiments, content 166 may be content associated with online bank accounts, online credit accounts, and other financial accounts. In other embodiments, content 166 may be content associated with an email account, chat account, or other communication account. In some embodiments, content 166 may be content associated with consumer accounts, such as accounts held with one or more merchants. While content 166 is illustrated within server 160, in other embodiments, content 166 may be located on another computer system or within multiple computer systems (e.g., in a distributed computing environment).

User 170 may use application 110 to access content on another computer system, such as content 166. For example, application 110 may be a web browser and content 166 may be online bank account data. In this case, the user may use the web browser to log on to an online bank account and access the bank account data. In various embodiments, authentication component 100 may detect when application 110 is attempting to utilize password-based authentication. For example, when a user registers for an online account via the Internet, a registration display may prompt the user for a desired username and password. In this case, authentication component 100 may detect the presence of such a registration display and implement the username and verifier registration technique as described above in regard to FIG. 2A and FIG. 3. In other words, authentication component 100 may automatically detect a display of application 110 that is associated with the registration of a username and password (e.g., for an online account) and prompt the user for a username and PWD in order to register a verifier with server 160, such as according to the method described above in regard to FIG. 3. Similarly, authentication component 100 may detect subsequent password-based authentication displays, such as the login screen of an online bank account or email account. In response to detecting a password-based authentication display, authentication component 100 may prompt the user for a username and PWD in order to request authentication from server 160, such as according to the method described in FIG. 4.

Figure 6A:
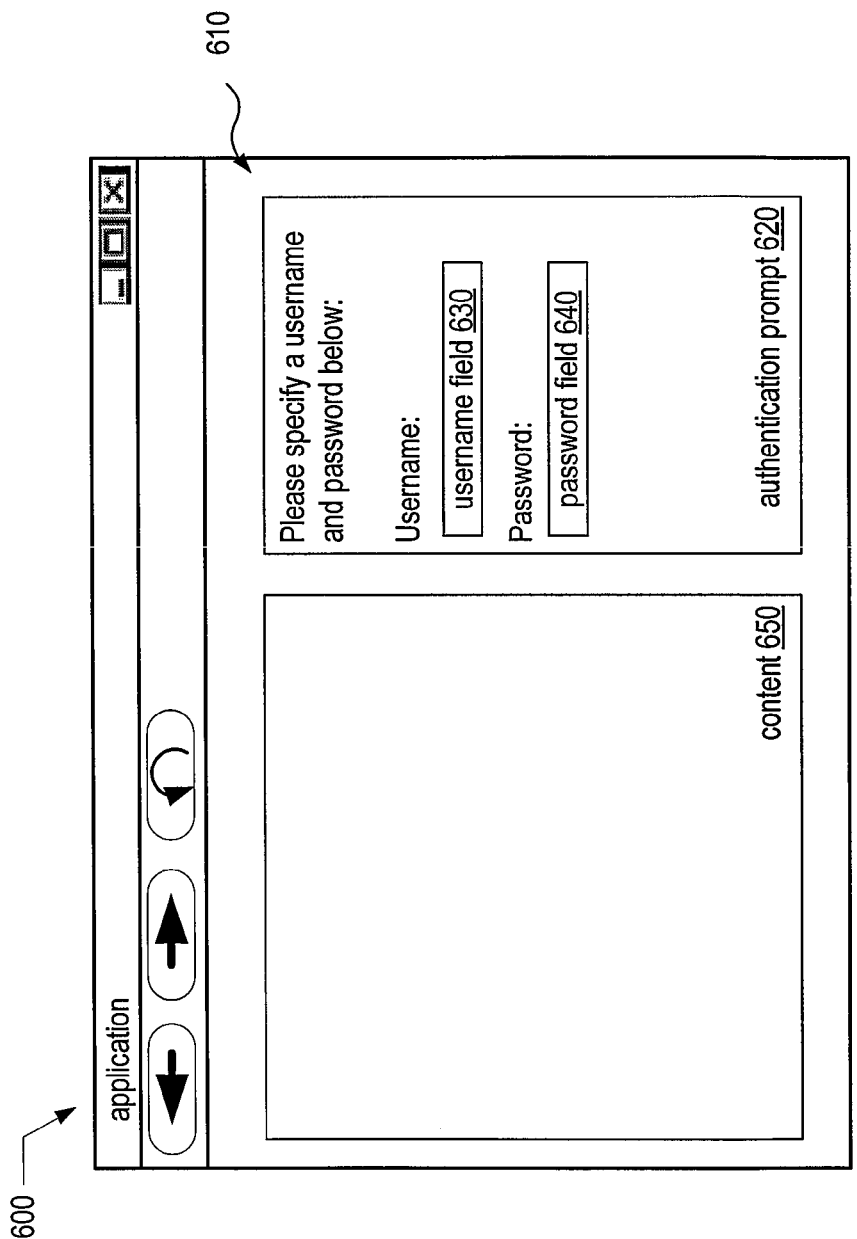
FIG. 6A is a block diagram illustrating an exemplary display of an application to which an authentication component may communicate.
Figure 6B:
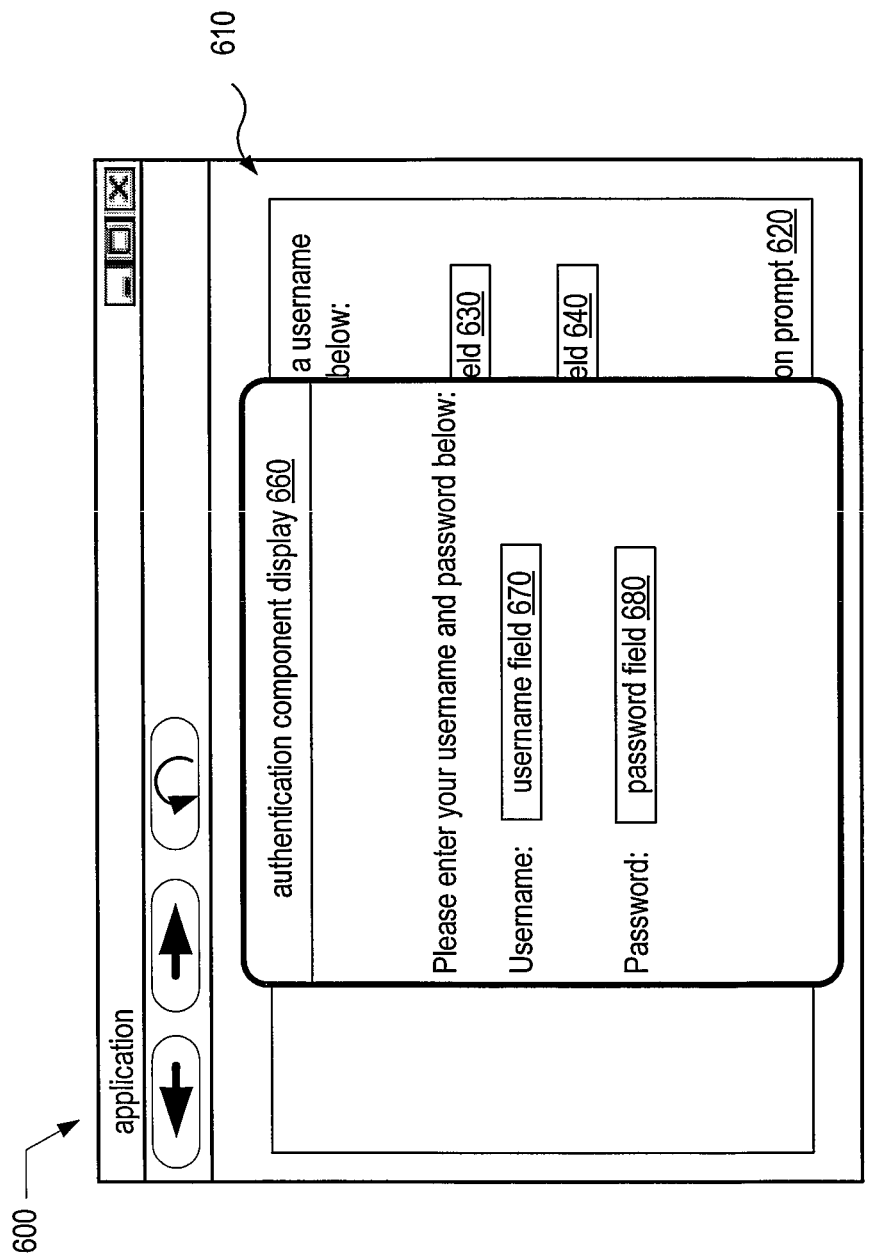
FIG. 6B is a block diagram illustrating an exemplary display of an authentication component configured to receive a username and password from a user.

FIGS. 6A and 6B illustrate exemplary displays of an application and an authentication component. One example of a registration display may include display 610 of FIG. 6A. Display 610 may be a display of application 600, which may be any of the various applications described above in regard to application 110. For example, in one embodiment, display 610 may be the display of a web browser. Content 650 may be content of application 600. For instance, if application 600 were a web browser, content 650 may be web content (e.g., a web page, an applet, or other web-related item). Additionally, display 610 may include an authentication prompt that includes fields for entering a username and password, such as username field 630 and password field 640. As described above in regard to FIG. 5, authentication component may detect password-based authentication displays such as display 610. To enable the user to utilize the functionality of authentication component 100, the authentication component may present a display (e.g., a pop up display), such as authentication component display 660 of FIG. 6B. In one embodiment, the authentication component display may be implemented with Adobe Flash™ technology. For example, in one embodiment, application 600 may be a web browser equipped with the Adobe Flash Player™ plugin. Authentication component display 660 may include a username field 670 and a password field 680. In various embodiments, username field 670 and password field 680 may enable a user to enter a username for a particular account (e.g., online bank account) and a PWD for use with the authentication methods described above in regard to FIGS. 3 and 4.

Exemplary System

Various embodiments of a system and method for secure password-based authentication, as described herein, may be executed on one or more computer systems, which may interact with various other devices. One such computer system is computer system 700 illustrated by FIG. 7. Computer system 700 may be capable of implementing an authentication component, such as authentication component 100, and one or more applications, such application 110. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing an authentication component and an application, such as authentication component 100 and application 110 described above, are shown stored within system memory 720 as authentication component 725 and application 726, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems (e.g., server 160), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Figure 7:
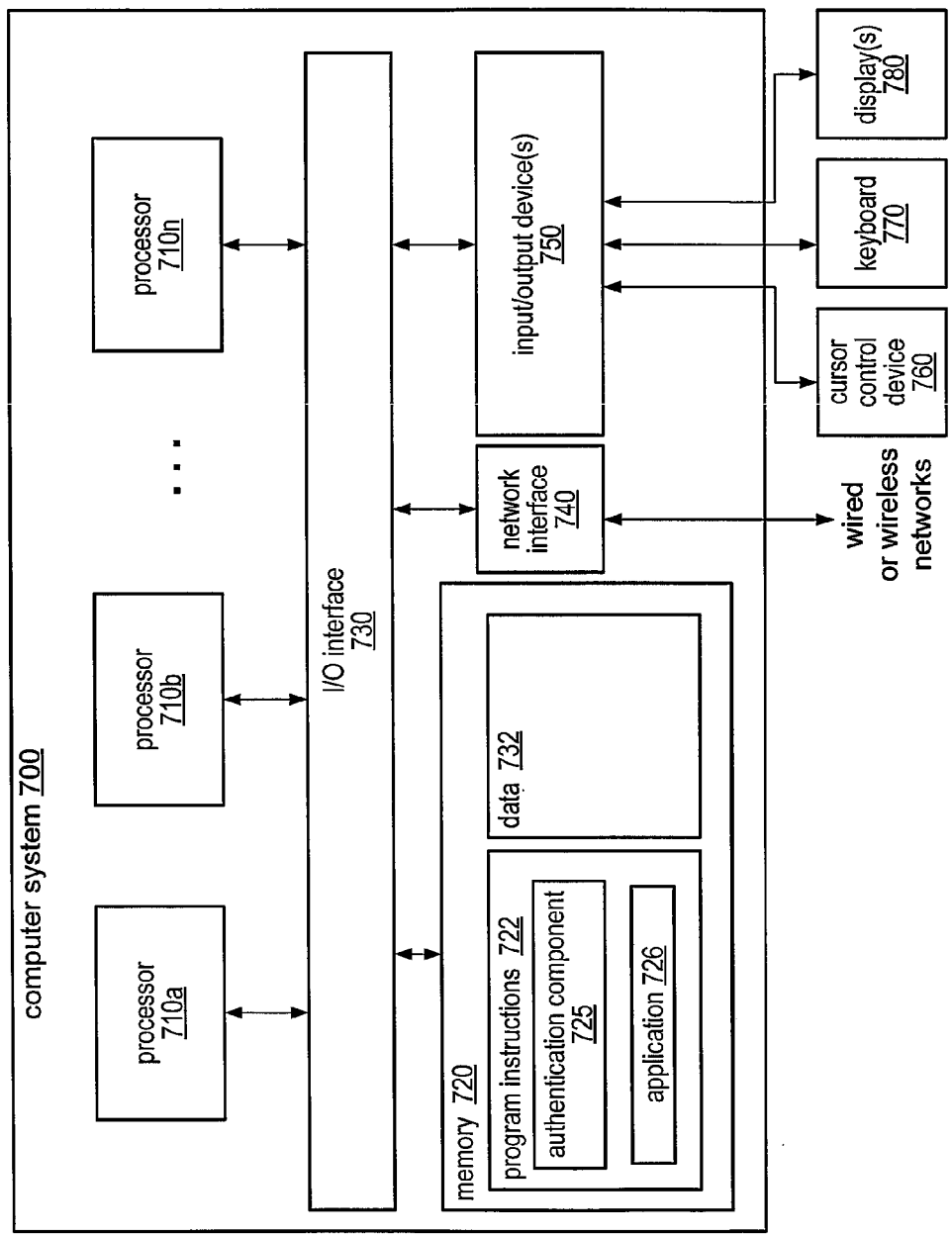
FIG. 7 illustrates a computing system suitable for implementing elements of a system and method for secure password based authentication, according to one embodiment.

As shown in FIG. 7, memory 720 may include program instructions 722 configured to implement an authorization component, such as authorization component 100, and application 726, similar to application 110. In one embodiment, authorization component 725 may implement the methods described above, such as the methods illustrated by FIGS. 3 and 4. In other embodiments, different elements and data may be included.

Those skilled in the art will appreciate that computer system 700 is merely illustrative and is not intended to limit the scope of the present invention. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A system, comprising:
one or more processors; and
memory, communicatively coupled to the one or more processors, storing an authentication component configured to:
    receive a password;
    responsive to receiving the password, access a master password;
    create a generated password by applying a hash function to the password and the master password;
    generate a verifier by applying a hash function to the generated password and a salt;
    responsive to determining that the generated password or the verifier does not meet a particular constraint, modify both the password and the master password and repeat generation of the verifier by using the modified password and the modified master password until the particular constraint is met;
    responsive to determining that the generated password or the verifier does meet the particular constraint:
        send the verifier to a remote server; and
        request authentication from the remote server according to a zero knowledge proof protocol.

2. The system of claim 1, wherein the authentication component receives the salt from the remote server.

3. The system of claim 1, wherein the verifier sent to the remote server does not include the received password or the generated password.

4. The system of claim 1, wherein to create the generated password by applying the hash function to the password and the master password includes summing the password and the master password prior to applying the hash function.

5. The system of claim 1, wherein the particular constraint includes a bit pattern constraint.

6. The system of claim 1, the authentication component further configured to, responsive to modifying both the password and the master password, reapply the hash function to the password and the master password.

7. The system of claim 1, wherein to modify both the password and the master password includes applying an increment or a decrement of the password or the master password.

8. The system of claim 1, wherein the authentication component receives the password from an application.

9. The system of claim 8, wherein the application includes a web browser.

10. The system of claim 8, wherein the authentication component is included as a component of the application.

11. The system of claim 8, wherein the authentication component is included as a component of an application different from the application that receives the password.

12. The system of claim 1, the authentication component further configured to receive authentication from the remote server based, at least in part, on the verifier.

13. The system of claim 1, wherein the zero knowledge proof protocol includes a Secure Remote Password (SRP) protocol.

14. The system of claim 1, wherein the hash function applied to the password and the master password or the hash function applied to the generated password and a salt includes a Secure Hash Algorithm (SHA) function.

15. The system of claim 1, wherein the particular constraint includes a bit pattern constraint that specifies a specific number of bit values.

16. A method implemented by one or more computing systems, the method comprising:
   receiving a password;
   responsive to receiving the password, accessing a master password;
   creating a generated password by applying a hash function to the password and the master password;
   generating, according to a zero knowledge proof protocol, a verifier by applying a hash function to the generated password and a salt;
   responsive to determining that the generated password or the verifier does not meet a particular constraint, modifying both the password and the master password and repeating generation of the verifier by using the modified password and the modified master password until the particular constraint is met; and
   responsive to determining that the generated password or the verifier does meet the particular constraint: sending the verifier to a remote server.

17. The method of claim 16, further comprising receiving the salt from the remote server.

18. The method of claim 16, wherein the particular constraint includes a bit pattern constraint that specifies a specific number of bit values.

19. The method of claim 16, wherein the particular constraint specifies a number of leading zero bits in a bit pattern.

20. The method of claim 16, wherein modifying both the password and the master password includes applying an increment or a decrement to the password or the master password.

21. The method of claim 16, further comprising receiving authentication from the remote server based, at least in part, on the verifier.

22. The method of claim 16, further comprising requesting authentication, from the remote server, according to a zero knowledge proof protocol.

23. The method of claim 16, wherein the zero knowledge proof protocol includes a Secure Remote Password (SRP) protocol.

24. The method of claim 16, wherein the salt is associated with a particular webpage or an online account.

25. A computer-readable storage medium, excluding signals per se, storing instructions that, responsive to execution, direct a computing device to perform operations comprising:
   receiving a password;
   responsive to receiving the password, accessing a master password;
   creating a generated password by applying a hash function to the password and the master password;
   generating, according to a zero knowledge proof protocol, a verifier by applying a hash function to the generated password and a salt;
   responsive to determining that the generated password or the verifier does not meet a particular constraint, modifying both the password and the master password and repeating generation of the verifier by using the modified password and the modified master password until the particular constraint is met; and
   responsive to determining that the generated password or the verifier does meet the particular constraint: sending the verifier to a remote server.

26. The computer-readable storage medium of claim 25, further comprising receiving the salt from the remote server.

27. The computer-readable storage medium of claim 25, wherein modifying both the password and the master password includes applying an increment or a decrement to the password or the master password.

28. The computer-readable storage medium of claim 25, further comprising receiving authentication from the remote server based, at least in part, on the verifier.

29. The computer-readable storage medium of claim 25, further comprising requesting authentication, from the remote server, according to a zero knowledge proof protocol.

30. The computer-readable storage medium of claim 25, wherein the zero knowledge proof protocol includes a Secure Remote Password (SRP) protocol.

31. The computer-readable storage medium of claim 25, wherein the master password is user-specified.

32. The computer-readable storage medium of claim 25, wherein the particular constraint requires a particular pattern be present within the generated password.

33. The computer-readable storage medium of claim 25, wherein the salt identifies the remote server or identifies an account protected by authentication.

* * * * *